Sept. 28, 1937.  G. E. PORTER  2,094,135
CLUTCH OPERATING MEANS
Filed March 25, 1936  3 Sheets-Sheet 1

INVENTOR
Gilbert E. Porter
BY
Morgan Finnegan and Durham
ATTORNEY

Sept. 28, 1937.  G. E. PORTER  2,094,135
CLUTCH OPERATING MEANS
Filed March 25, 1936  3 Sheets-Sheet 2
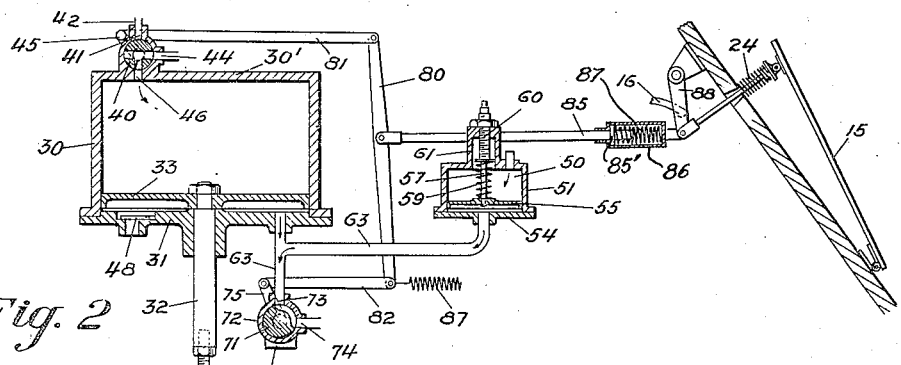

Sept. 28, 1937.  G. E. PORTER  2,094,135
CLUTCH OPERATING MEANS
Filed March 25, 1936  3 Sheets-Sheet 3

INVENTOR
Gilbert E. Porter
BY
Morgan Finnegan and Durham
ATTORNEY

Patented Sept. 28, 1937

2,094,135

UNITED STATES PATENT OFFICE 2,094,135

CLUTCH OPERATING MEANS

Gilbert E. Porter, Detroit, Mich.

Application March 25, 1936, Serial No. 70,759

13 Claims. (Cl. 192—.01)

The present invention relates to fluid pressure motors and more particularly to a novel and improved suction-operated motor for the power actuation of an automotive vehicle clutch.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a diagrammatic sectional view of the embodiment shown in Figure 1 with the parts in clutch engaged position;

Figure 3 is a similar view of the parts with the clutch in fully released position;

Figure 1:
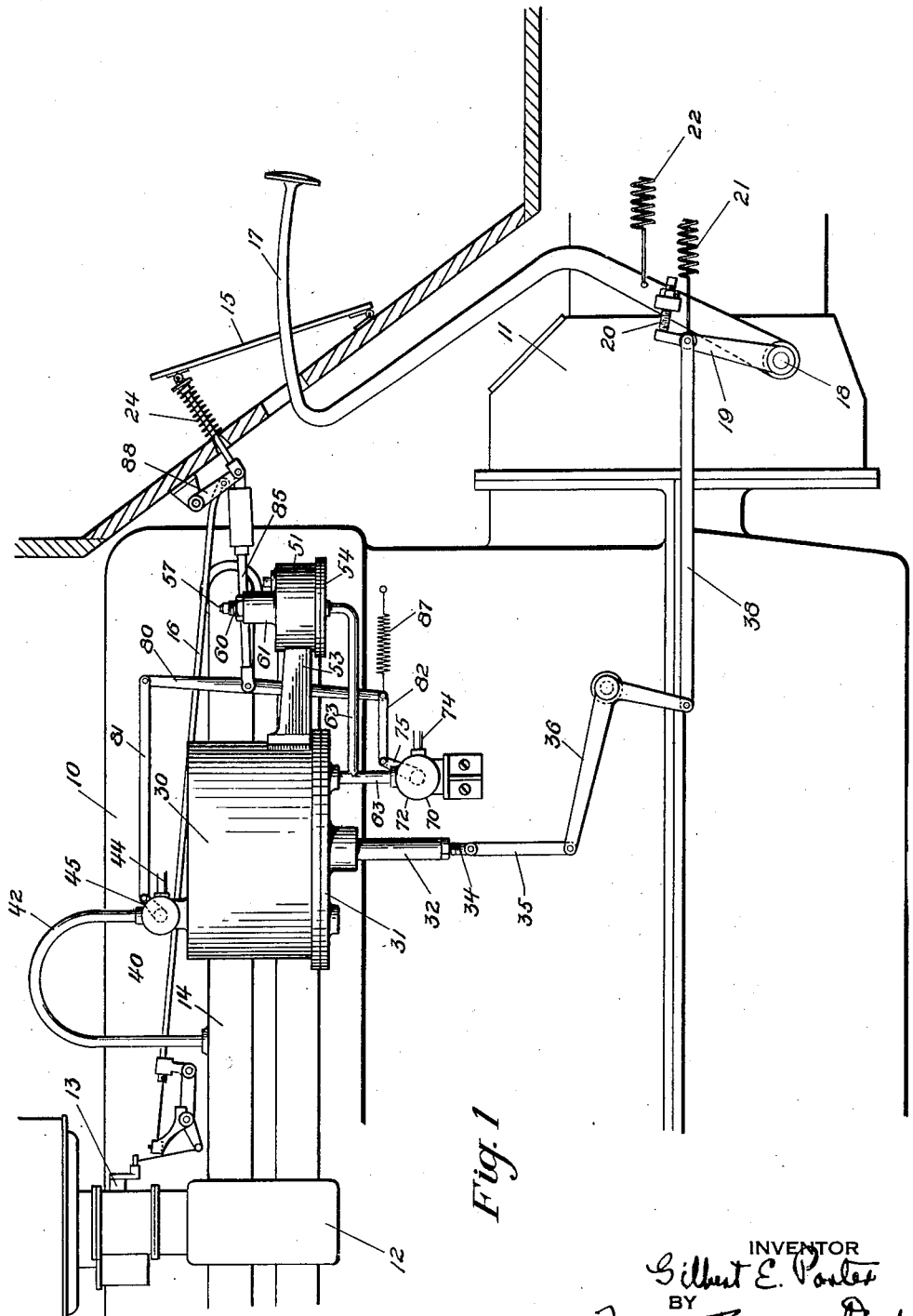
Figure 1 is a side elevation of an illustrative embodiment of the invention and shows the fluid pressure operated motor as applied to the operation of an automobile clutch by the suction developed in the intake manifold of the internal combustion engine.

The present invention has for its object the provision of a novel and improved fluid pressure motor particularly adapted for the power operation of an automobile clutch. A further object of the invention is to provide such a mechanism, powered by the intake manifold suction under control of the engine throttle, and which provides a smooth clutch engagement substantially regardless of the rapidity with which the accelerator is opened. A further object of the invention is the provision of a fluid pressure motor having a resiliently expansible auxiliary chamber which is selectively operable to check the movement of the motor piston at certain stages of its movement. Still another object is the provision of a novel and improved means for operating the fluid pressure controlling valves.

In the present embodiment of the invention, there is provided a fluid pressure cylinder having a piston movable therein connected to operate the automobile clutch. The throttle control for the internal combustion engine is connected with valves at each end of the cylinder, while one end of the cylinder is connectible with the intake manifold of the engine and the other end of the cylinder is connectible with a resiliently expansible auxiliary chamber. The valves are interconnected so that by movement of the accelerator one of the valves is slowly moved to stop the application of suction to the cylinder and to connect that end of the cylinder to atmosphere, while the other valve is quickly closed to render the auxiliary chamber operative. On return movement or closing of the throttle the suction controlling valve is first quickly opened to apply suction to the cylinder and the other valve is slowly opened, but an additional check valve may be provided to compensate for the slowly opening valve.

It will be understood that the foregoing general description, and the following detailed description as well, are exemplary and explanatory of the invention but are not restrictive thereof.

Referring now in detail to the illustrative embodiment of the invention as shown in the accompanying drawings, there is provided a conventional internal combustion engine 10 adapted to drive the automobile through the usual clutch 11, and this engine is provided with a carburetor 12 having a throttle 13 by which the fuel is delivered to the engine through the intake manifold 14 is controlled. The throttle 13 is controlled by an accelerator pedal 15 through the usual control rod 16. Manual means such as pedal 17 are provided for disengaging the clutch 11, and pedal 17 is preferably loosely mounted on the clutch fork shaft 18 to which is secured arm 19. At its end arm 19 contacts with screw 20 threaded on pedal 17, thereby permitting the arm 19 to move independently of pedal 17. Springs 21 and 22 are provided for returning the pedal 17 and arm 19 to clutch-engaging position, while spring 24 tends to move the throttle to idling position.

Rigidly mounted on the side of the engine 10 is a fluid pressure motor comprising cylinder 30 having a cylinder head 31 in which slides the piston rod 32 for piston 33 movable in the cylinder. At its lower end piston rod 32 is connected by link 35 to bell crank 36 which in turn is connected by link 38 to the clutch-operating arm 19, so that upon raising the piston the clutch is disengaged without movement of the clutch pedal 17.

The cylinder 30 comprises a cylindrical member having a closed end wall 30' and a head 31, and on the upper closed end 30' is mounted a three-way valve 40 connected to the intake manifold by port 41 and pipe 42, connected to atmosphere through port 44 and connected to the upper end of cylinder 30 by port 46. The rotatable valve member is adapted to connect the interior of the cylinder 30 alternatively to atmosphere or to vacuum, and when suction is applied the piston 33 is moved upwardly by the air pressure entering the lower end of the cylinder through check-valve 48 mounted in the lower head 31 of the cylinder.

In communication with the lower end of the cylinder, and selectively rendered effective is a resiliently expansible auxiliary chamber 50 which comprises a small cylinder 51 mounted by bracket 53 on a side wall of the cylinder 30. Cylinder 51 is provided with a closure 54 and a piston 55 which is alined centrally of the cylinder 51 by means of the guide 57 and is urged downwardly by means of spring 59 coiled between the piston 55 and the enlarged head of an adjusting screw 60 mounted in a tube 61 extending from the upper end of cylinder 51. This chamber is connected with the lower end of the cylinder 30 by means of the pipe 63 and is always in communication therewith. The volume of the chamber between piston 51 and the lower head 54 is preferably only a fraction of the volume of the chamber between piston 33 and head 31, and the relative size is determined largely by the amount of cushioning required and by the point at which the piston 33 is when engagement of the clutch starts.

Valve means are provided for rendering the chamber 51 effective and for controlling the release of air from the lower end of the cylinder 30, as air is admitted to the upper end of the cylinder, and for this purpose a rotary valve 70 is provided below the cylinder 30 and is connected to pipe 63, alternatively opening or closing this pipe and the lower end of cylinder 30 to the atmosphere. Valve 70 comprises a rotary valve member 71 and a valve body 72 having ports 73 and 74, and is provided with an arm 75 by which the rotary member is turned from open to closed position. With the valve 70 closed, movement of the piston towards clutch engaging position forces air into the chamber 51 and lifts the small piston 55, while opening of the valve 70 allows both the pistons 33 and 55 to move to their lowermost positions.

For moving the valves 70 and 40 in a predetermined sequence, means are provided interconnecting these valves, so that they may be operated by a single control member such as the accelerator pedal 15 with which they may be timed. As embodied, the rotary member of valve 40 is connected to arm 45 fixed thereto and this arm is connected to one end of beam 80 by means of link 81, while arm 75 is connected to the other end of beam 80 by means of link 82, and the central portion of this beam is pivotally connected to the control rod 85 by which the two valves are shifted between their alternative positions. At the lower end of beam 80 and adjacent to the point where link 82 is connected to the beam, is provided a spring 87 tending to move the beam 80 and arm 45 in a counter-clockwise direction.

Where the clutch is to be automatically operated by the accelerator pedal, the control rod 85 is connected to the accelerator pedal 15 and as embodied this is accomplished by connecting the control rod 85, the throttle control rod 16 and the accelerator pedal to a lever 88 pivotally mounted on the under side of the floor board. Control rod 85 is provided with an enlarged head 85' slidably received within cylindrical shell 86 and abuts against the end of coil spring 87 retained within the shell so that the rod 85 may yield as the accelerator pedal 15 is depressed but is positively retracted by the pedal 15.

When the accelerator pedal is in idling position, spring 87 retracts the link 82, holding valve 70 closed, and valve 40 is held in suction position by the accelerator return spring 24, while on depressing the accelerator pedal 15 to supply additional fuel to the engine 10, the valve 40 is first opened to atmosphere. On further depressing the accelerator pedal, valve 70 is opened to atmosphere, while on closing of the throttle by release of the accelerator pedal 15, the valve 70 is first closed, and thereafter the valve 40 is opened to suction.

The operation of the illustrative embodiment of the invention is shown in Figures 2, 3, 4 and 5 of the drawings.

Figure 2 shows the parts in clutch engaged position with the throttle partially opened.

Figure 3 shows the parts in clutch disengaging position and with the throttle in idling position.

Figure 4:
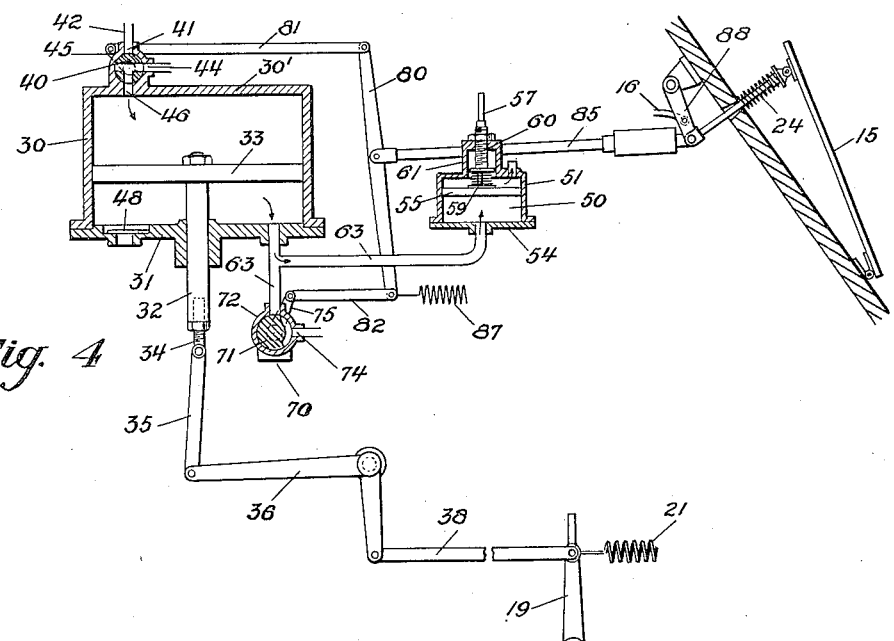
Figure 4 is a similar view with the parts starting to move to clutch engaging position.

Figure 4 shows the parts in position to engage the clutch lightly as the accelerator is partially depressed to accelerate the engine.

Figure 5:
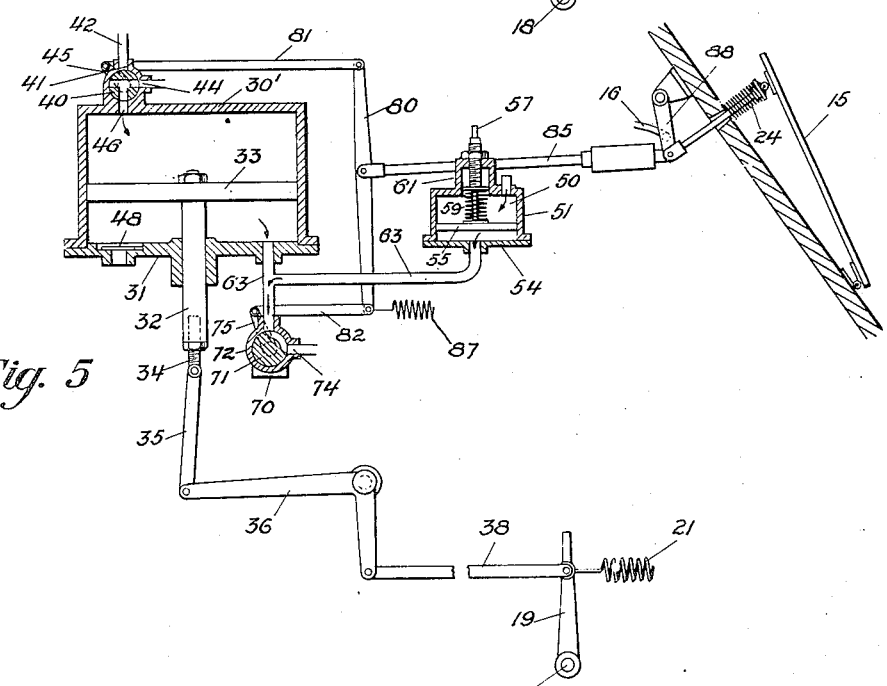
Figure 5 is a view of the parts at a later stage of the clutch engaging movement.

Figure 5 shows the parts in position to move the clutch from cushion engagement of the clutch to full engagement as the accelerator is further depressed.

Assuming that the operator is maintaining the accelerator pedal depressed as in the normal running of the vehicle, the valve 40 is held open to atmosphere, as is valve 70, and the piston 33 is held against the lower end of the cylinder 30 by the tension of spring 21, thus maintaining the clutch engaged.

Upon the operator lifting his foot from the accelerator pedal 15, spring 87 moves the valve 70 to closed position; spring 24 moves the valve 40 to suction position applying suction to the upper end of cylinder 30 and piston 33; check valve 48 opens to admit air to the lower end of cylinder 30; and the piston moves upwardly to disengage the clutch.

When the operator next opens the throttle, by depressing the accelerator pedal 15, this movement of the accelerator pedal is transmitted to rod 85 and by it to the beam 80 to move the beam 80 counter-clockwise about its lower end which is held against movement by spring 87, thus opening valve 40 to atmosphere. Piston 33 moves rapidly downwardly under the influence of spring 21 forcing air through the pipe 63 into the auxiliary chamber 51 where it forces piston 55 upwardly against the pressure of its spring 59 and when the pressure in chamber 51 equals the pressure in the lower portion of cylinder 30, piston 55 rebounds transmitting a pressure wave reversely through pipe 63 which, together with the normal pressure created by the compression of the air in this portion of the cylinder, tends to check the travel of the piston 33, and this checking preferably occurs at the point where the clutch begins to engage and transmit the power of the engine. Thus, the power is applied smoothly and the automobile begins to move smoothly and without jerking.

Upon further movement of the accelerator pedal 15, valve 70 is opened to atmosphere, due to the fact that valve 40 has reached the limit of its movement and link 81 forms a rigid support for the upper end of beam 80, so that the spring 87 can no longer restrain movement of the valve 70. Opening of the valve 70 releases the compressed air in the lower end of cylinders 30 and 51 and the piston then moves to the position shown in Figure 2 under the influence of spring 21, fully engaging the clutch.

By varying the position of screw 60, as well as by varying the relation of link 35 to piston rod 32 through the screw 34, the operation of the clutch may be accurately timed with reference to the throttle, and the mechanism may be adjusted for rapid acceleration as well as for unusually slow acceleration, thereby suiting the mechanism to the individual characteristics of various drivers.

The invention in its broader aspects is not limited to the specific mechanisms shown and described but departures may be made therefrom within the scope of the accompanying claims without departing from the principles of the invention and without sacrificing its chief advantages.

What I claim is:—

1. In an automotive vehicle, the combination of a clutch, a fluid pressure motor for operating said clutch, means for controlling the flow of fluid at each end of the cylinder and control means interconnecting said controlling means for establishing equal pressures on both sides of the cylinder or a higher pressure on one side of the cylinder, and a resiliently expansible chamber connected to one end of the cylinder and to the atmosphere and controlled by one of said controlling means.

2. In a fluid pressure motor having a fluid pressure chamber, two valves, one connected to either end of the chamber, a control rod, and means connected to said rod and interconnecting said valves for first operating one valve and then the other by means of the control rod.

3. In a fluid pressure motor having a fluid pressure chamber, a valve alternatively connecting one end of the chamber to different pressures, a valve for closing or opening the other end of the chamber, a control member, and means interconnecting said valves for first moving the first valve and then moving the second valve by movement of the control member in one direction.

4. In a fluid pressure motor having a fluid pressure chamber, a valve alternatively connecting one end of the chamber to different pressures, a valve for closing or opening the other end of the chamber, a control member, and means interconnecting said valves for first moving the first valve and then moving the second valve by movement of the control member in one direction and for moving the second valve first by movement of the control member in the other direction.

5. In a fluid pressure operated motor for the power operation of an automotive clutch, a fluid pressure cylinder, a piston operable therein, a valve controlling the application of fluid pressure to one end of the cylinder, an auxiliary chamber connected to the other end of the cylinder, a valve controlling the venting of the chamber and interconnected valve operating means for operating said valves in a predetermined sequence.

6. In a fluid pressure operated motor for the power operation of an automotive clutch, a fluid pressure cylinder, a piston operable therein, a valve controlling the application of fluid pressure to one end of the cylinder, an auxiliary chamber connected to the other end of the cylinder, a valve controlling the venting of the chamber and means interconnecting said valves for first operating one valve and then the other by means of a single control member.

7. In a fluid pressure operated motor for the power operation of an automotive clutch, a fluid pressure cylinder, a piston operable therein, a valve controlling the application of fluid pressure to one end of the cylinder, an auxiliary chamber connected to the other end of the cylinder, a valve controlling the venting of the chamber, control means for differentially operating said valves to control the movement of said piston and a throttle control element by which the control means are moved.

8. In a fluid pressure operated motor for the power operation of an automotive clutch, a fluid pressure cylinder, a piston operable therein, a valve controlling the application and release of fluid pressure to one end of the cylinder, an auxiliary chamber connected to the other end of the cylinder, a metering valve controlling the venting of the chamber, control means for differentially operating said valves to control the movement of said piston and a throttle control element by which the control means are moved.

9. In a fluid pressure operated motor for the power operation of an automotive clutch, a fluid pressure cylinder, a piston operable therein, a valve controlling the application and release of fluid pressure to one end of the cylinder, an auxiliary resiliently expansible chamber connected by a small duct to the other end of the cylinder, a valve controlling the venting of the chamber, and interconnected control means for differentially and concomitantly operating said valves to control the movement of said piston.

10. In a fluid pressure operated motor for the power operation of an automotive clutch, a fluid pressure cylinder, a piston operable therein, a valve controlling the application of fluid pressure to one end of the cylinder, an auxiliary chamber connected to the other end of the cylinder, a metering valve controlling the venting of the chamber and interconnected control means for differentially and concomitantly operating said valves to control the movement of said piston.

11. In a fluid pressure operated motor for the power operation of an automotive clutch, a fluid pressure cylinder, a piston operable therein, a valve controlling the application and release of fluid pressure to one end of the cylinder, an auxiliary resiliently expansible chamber connected by a small duct to the other end of the cylinder, a valve controlling the venting of the chamber and means interconnecting said valves for first operating one valve and then the other by means of a single control member.

12. In a fluid pressure operated motor for the power operation of an automotive clutch, a fluid pressure cylinder, a piston operable therein, a valve controlling the application of fluid pressure to one end of the cylinder, an auxiliary resiliently expansible chamber connected by a small duct to the other end of the cylinder, a valve controlling the venting of the chamber and means interconnecting said valves for first operating one valve and then the other by means of a single control member.

13. In a fluid pressure operated motor for the power operation of an automotive clutch, a fluid pressure cylinder, a piston operable therein, a valve controlling the application of fluid pressure to one end of the cylinder, an auxiliary resiliently expansible chamber connected by a small duct to the other end of the cylinder, a metering valve controlling the venting of the chamber and interconnected valve operating means for operating said valves in a predetermined sequence.

GILBERT E. PORTER.